United States Patent [19]

Touchette

[11] 4,023,789
[45] May 17, 1977

[54] METHOD AND APPARATUS FOR REGISTERING, FEEDING AND SEPARATING ORIGINAL AND COPY SHEETS IN A DUPLICATOR

[75] Inventor: Albert F. Touchette, Shutesbury, Mass.

[73] Assignee: Scott Paper Company, Philadelphia, Pa.

[22] Filed: May 1, 1975

[21] Appl. No.: 573,736

Related U.S. Application Data

[62] Division of Ser. No. 440,457, Feb. 7, 1974, Pat. No. 3,891,318.

[52] U.S. Cl. ................ 270/58; 101/126; 101/407 R; 271/236; 271/241
[51] Int. Cl.² .................................... B65H 39/00
[58] Field of Search ............ 270/58; 214/6 R, 6 FS, 214/6 M, 6 S, 7, 8.5 A, 8.5 B, 8.5 C, 8.5 R, 8.5 F, 9; 271/9, 12, 236–237, 241; 101/415.1, 126, 407 BP; 93/93 M, 93 R, 93 DP; 156/297, 300, 364; 211/46–47

[56] References Cited
UNITED STATES PATENTS

| | | | |
|---|---|---|---|
| 1,623,195 | 4/1927 | Maxner | 214/6 S |
| 1,851,972 | 4/1932 | Blauvelt | 214/6 S |
| 2,937,485 | 5/1960 | Wall | 214/6 S |
| 3,111,233 | 11/1963 | Raynor | 214/6 S |
| 3,857,337 | 12/1974 | Tsuji | 101/126 |

Primary Examiner—Edgar S. Burr
Assistant Examiner—A. Heinz
Attorney, Agent, or Firm—Michael R. Chipaloski; John W. Kane, Jr.

[57] ABSTRACT

Method and apparatus for feeding original and copy sheets in a duplicator having an improved copyboard containing a radiation-transmissive plate adapted to carry superposed thereon the original and copy sheets with the original disposed between the plate and the copy sheet, the copyboard being linearly reciprocatable between a loading station, at which the original and copy sheets may be positioned on the plate, and an exposure station, at which the copy sheet is exposed through the radiation-transmissive plate and the original sheet and is thereafter removed for further processing. At the end of each exposure cycle, the copyboard moves back to the loading station carrying thereon the original sheet for the initiation of a subsequent sequence. Also disclosed are method and apparatus for accurately registering the copy sheet and original sheet on the copyboard and method and apparatus for separating the exposed copy sheet from the original sheet.

3 Claims, 18 Drawing Figures

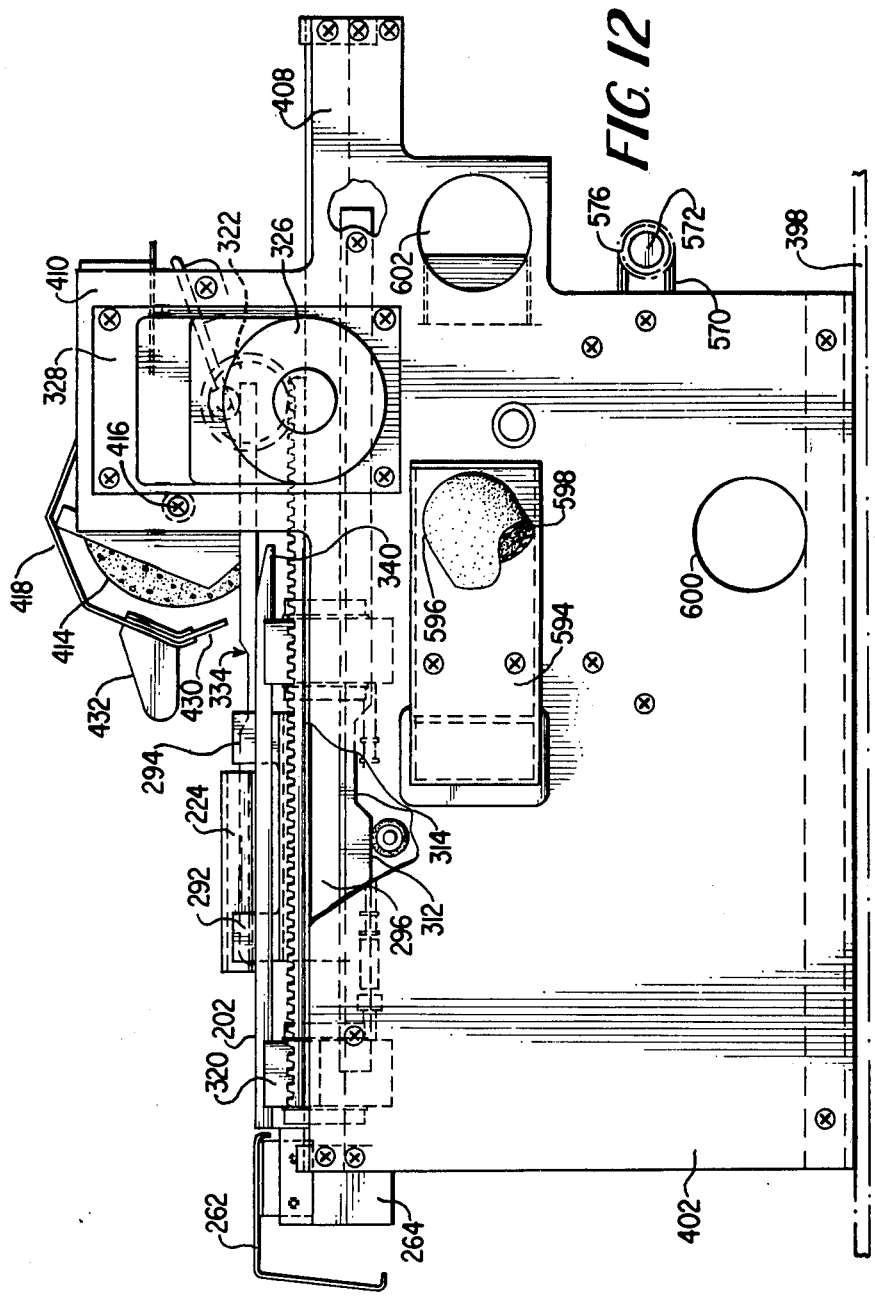

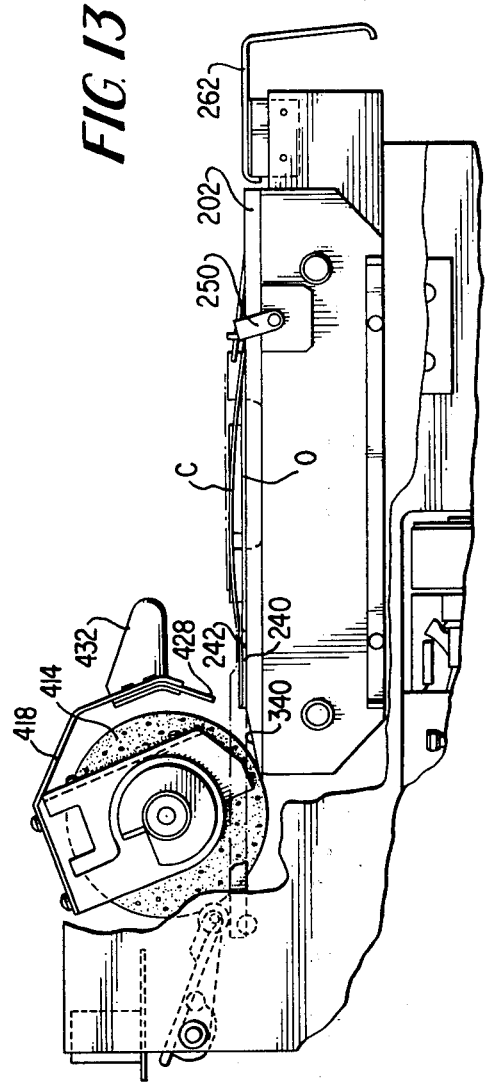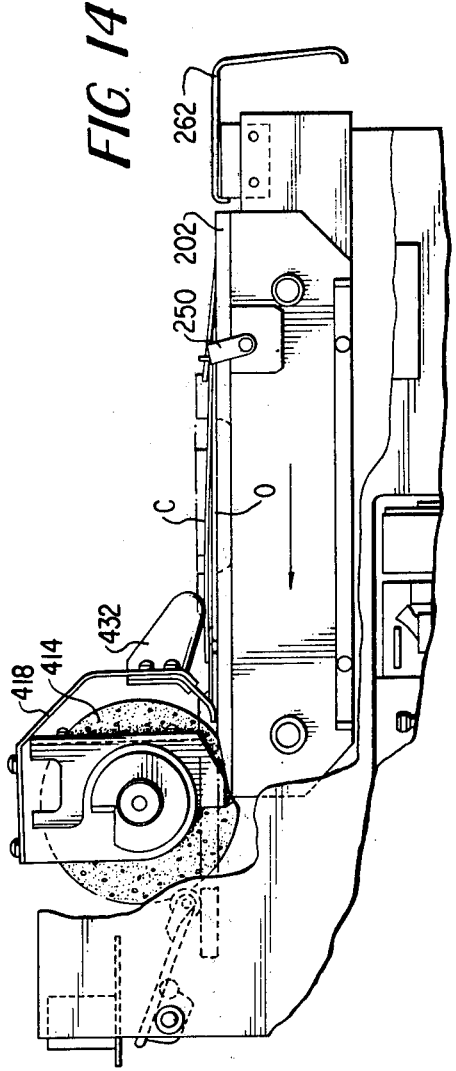

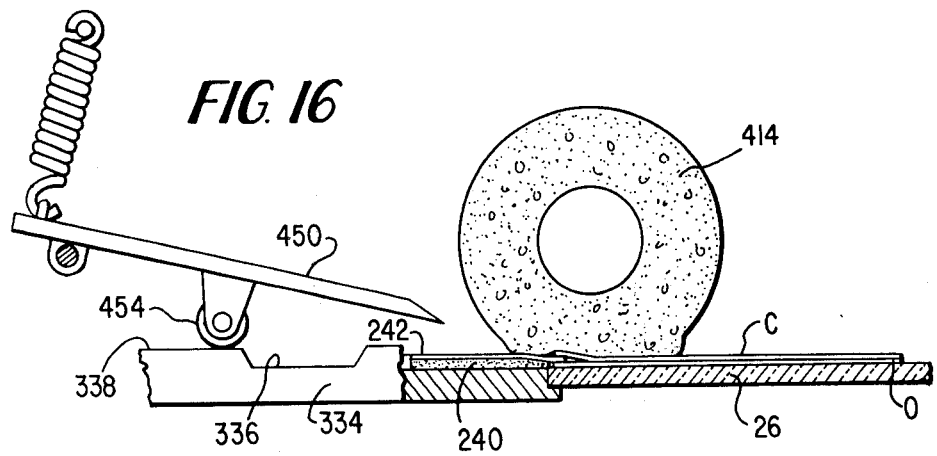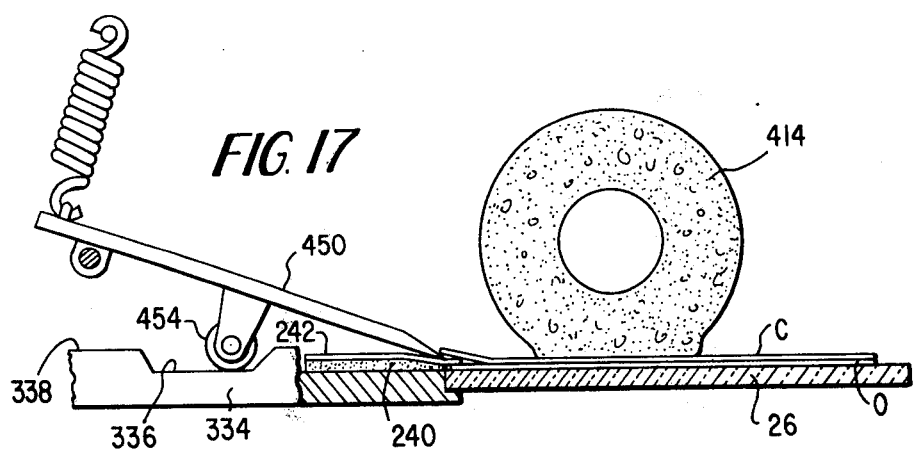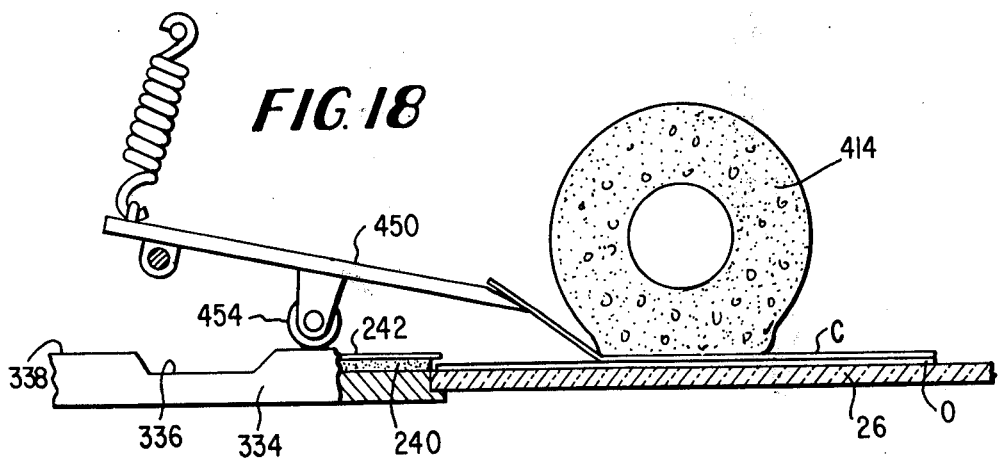

METHOD AND APPARATUS FOR REGISTERING, FEEDING AND SEPARATING ORIGINAL AND COPY SHEETS IN A DUPLICATOR

This is a division of application Ser. No. 440,457, filed Feb. 7, 1974, now U.S. Pat. No. 3,891,318.

RELATED APPLICATIONS

The present invention is described but not claimed in commonly assigned copending application U.S. Ser. No. 339,284 for MICROFICHE DUPLICATOR filed Mar. 8, 1973 in the names of joint inventors Albert Francis Touchette and Nils L. Hakanson, the former being the sole inventor of the subject invention. The disclosure of the present invention in U.S. Ser. No. 339,284 was derived from the present applicant.

BACKGROUND OF THE INVENTION

1. Field of the Invention

The present invention relates generally to registering a plurality of thin sheets of material, transporting them while registered through a processing station, and separating the sheets from each other. The invention more particularly relates to registering a copy sheet and an original sheet of film on a copyboard for transporting the film through an exposure station of a photographic duplicator and separating the copy film from the copyboard while leaving the original thereon.

2. Description of the Prior Art

As a result of the growing volume of documentary material presently being stored in photographic form, the need has arisen for a versatile photographic copier, and particularly a microfiche copier, which is both simple in design and operation, requires minimal operation maintenance, and has the capability of providing high quality single or multiple copies automatically.

A number of approaches have been taken in the past in an effort to meet this need and generally have proven satisfactory for their intended purpose. A typical microfiche duplicator is of the direct contact exposure type where a copy sheet, in contact with an original sheet, is exposed to actinic radiation (e.g., ultraviolet light) through the original and then developed. In such an apparatus, the original microfiche sheet and the copy film sheet are typically fed to the exposure station of the apparatus together in order that they may be held in direct contact and exposed while so contacted. Alternatively, if separate feeding devices are employed for the original and microfiche sheets, means must be provided for assuring that the two sheets become superposed at the exposure station and are in contact with each other during exposure.

Some of the prior art microfiche duplicators employ exposing apparatus which comprises a radiation-transparent cylinder, or at least a portion of which is radiation-transparent, around which the superposed original and copy sheets are fed. The sheets are normally maintained in contact with the periphery of the exposure cylinder by means of, for example, resilient and flexible conveyor belts.

Another approach of the prior art has been to dispose a radiation-transmissive flat plate above or opposite a source of radiation, such as an ultraviolet lamp, and feed the superposed sheets past the radiation-transmissive plate for exposure, the feeding being accomplished by means of, for example, a resilient roll which functions both to feed the superposed sheets past the exposure lamp and to maintain good contact between the two sheets during exposure.

Various means are also suggested in the prior art for feeding the original and copy sheets to the exposure device, such as endless belt means or other guide means through which are fed the two sheets to the exposure station. There has been a need for apparatus for feeding the original and copy sheets to the exposure device which is efficient in operation and which is not complex in design and which accurately registers the sheets together. The problem is further complicated by the fact that, in a direct contact type of microfiche duplicator, the original and copy sheets must be separated from each other after exposure so that the exposed copy sheet can be fed to the development means of the device. Therefore, the means for feeding the original and copy sheets to the exposure device must be designed so as to permit easy separation of the two sheets following exposure.

The problem of accurate registration of the copy with the original sheet has been recognized in the past, and the prior art has several suggestions for remedying this difficulty. For example, U.S. Pat. No. 3,211,073, Fosse et al, discloses an automatic apparatus designed to photographically reproduce film sections such as microfilm mounted in aperture cards. The patentees provide means for conveying the superimposed original and copy film sections in accurate registry past a photoprinter device. Referring to the figures of this patent, the superimposed cards are placed in a "pocket" 24 and proper longitudinal alignment thereof is assured by the fact that pusher members 58 move the cards into firm contact with an upstanding flange attached to a base plate. Proper transverse alignment is provided by an aligning assembly generally designated 171. Specifically, a spring mechanism serves to move a transversely reciprocatable head 185 engaging the ends of the cards to move the same in a direction transverse to the conveyor forcing the cards into firm contact with the inner faces of blocks 150 and 151. Following registration, a platen 155 presses the cards together and holds them so that there is no possibility for shifting of one card relative to the other as the individual pockets carrying the registered cards are conveyed across the exposure unit.

U.S. Pat. No. 2,927,210, O'Mara discloses a copying machine wherein superimposed original and copy sheets are fed to a standby position and longitudinally aligned by abutting a stop means which is upstanding on the frame supporting the device. Upon retraction of the stop means, the original and copy sheets begin the copying sequence and are fed through the exposure apparatus.

Several prior art patents disclose the use of electrostatic registration means; to wit, U.S. Pat. No. 3,650,623, Beispel; U.S. Pat. No. 3,661,457, Frech; and U.S. Pat. No. 3,676,001, Botkin.

Although not related to photocopying apparatus, U.S. Pat. No. 936,108, Ford discloses a feed mechanism adapted for use in feeding sheets of tin plate or other stiff material to a printing couple of a printing press and is provided with registering means to assure that the sheets are accurately positioned relative to the printing couple.

Thus, while the prior art suggests various techniques for assuring accurate registration of the original and copy sheets fed to the exposure station of a photocopying device, complex apparatus is often required. A need exists therefore for a sheet registration device which is simple in design and yet effective to assure accurate registry of a copy sheet with an original microfiche sheet prior to exposure in a photocopy device.

Of the above-described copy apparatus difficulties, one of the most significant is in the separation apparatus used to separate the master and copy sheets after exposing the copy through the master. In those devices which embody integral developing means with the exposing means, it is essential to separate the master and copy sheets after exposure and prior to development in order that the separated copy sheet can be fed to the developing part of the apparatus, and the master returned to the operator. If for some reason the master as well as the copy sheet is fed to the developing chamber, the master can be damaged significantly or, at worst, the information recorded thereon can be destroyed.

The prior art suggests various techniques for assuring positive separation of the master and copy sheets following exposure and prior to development. For example, many prior art devices utilize vacuum means to separate the master and copy sheets following exposure. This of course requires at least one vacuum-inducing device upon either side of the superposed original/copy sheets. A typical vacuum-separation means is disclosed in U.S. Pat. No. 3,549,255, Umahashi et al.

Another suggestion involves the use of a mechanical finger which catches the leading edge of the original which extends beyond the leading edge of the copy sheet thereby deflecting the original from the path leading to the development portion of the device. Reference is made to U.S. Pat. No. 3,419,328, Klosky et al and U.S. Pat. No. 3,416,863, Ralston for disclosure of such devices.

An alternative technique is disclosed in U.S. Pat. No. 3,215,055, Campbell et al, which relates to an automatic copying machine of the contact printing type. A carrier (having a pair of flexible magnetic strips disposed adjacent the edge portion beyond the outer edges of the original) bearing the original thereon travels around a transparent rotating drum in which is mounted a light source. A sheet of copy paper is superposed on the original and this superimposed assembly is then advanced between the drum and flexible guide means. Vacuum means is employed to separate the copy sheet from the original, and in order to prevent the separation of the original from the drum when multiple copies of the original are desired, magnetic means disposed within the transparent drum functions to hold the carrier (bearing the original thereon) in contact with the drum by acting with the magnetic means located in the carrier. In order to separate the carrier from the surface of the drum, a resilient ejector or deflector blade, actuated by a solenoid, contacts and resiliently biases the outer surface of the rotating drum thereby separating the original therefrom despite the attractive force exercised by the magnetic holding assembly. The continuing rotation of the drum moves the carrier assembly away from the outer surface of the drum and over the ejector blade which is pressed against the outer surface.

A related device is disclosed in U.S. Pat. No. 2,574,215, Kunstadter, which relates to an automatic-photo printing device wherein the superimposed original and copy sheets travel around a drum in which a light source is disposed. The leading edge of the original is behind the leading edge of the copy sheet as it travels around the drum. A separating tongue is kept against the surface of the drum and as the leading edge of the copy sheet reaches this point, it breaks an electromagnetic circuit and causes the tongue to be deflected against another cylinder which separates the copy sheet from the original and transports the copy sheet to the developing apparatus. The original remains on the first drum and is returned to the operator.

Simpler devices are suggested in the prior art, including mechanical fingers or claws which are disposed at a point intermediate the exposure station and the development station and are designed to "catch" or "trap" either the original or copy sheets and transport them either back to the operator or to the development section, respectively.

Reference is made to the following U.S. Patents which disclose other types of original/copy sheet separation apparatus: U.S. Pat. Nos. 3,022,716; 3,324,292; 3,331,276; 3,498,709; and 3,547,538.

Despite these teachings of the prior art, which ordinarily function as intended, the need exists for a simple yet effective sheet separation device for positively separating a copy sheet from an original sheet after the copy has been exposed through the original sheet thereby enabling the copy sheet to be fed to the development portion of the apparatus.

SUMMARY OF THE INVENTION

It is an object of the present invention to provide improved rectilinear transport means for feeding an original and copy sheet to the exposure station of a photocopy machine.

It is a further object of the present invention to provide improved means for feeding superposed original microfiche and copy film sheets to the exposure station of a microfiche duplicator of the direct contact type.

It is a further object of the present invention to generally provide apparatus for accurately registering a plurality of superposed thin sheets of material and specifically to provide such registration means for accurately registering an original microfiche sheet and a copy sheet in a microfiche duplicator.

It is yet a further object of the present invention to provide a sheet registration apparatus for a microfiche duplicator which is simple and yet effective to assure accurate automatic registration of the original and copy sheets fed to an exposure station of the microfiche duplicator.

It is further an object of the present invention to generally provide a separation device for positively separating thin sheets of film and specifically to provide a device for separating an original microfiche sheet from a copy sheet after the copy has been exposed through the original in a microfiche duplicator of the contact printing type.

It is yet a further object of the present invention to provide a sheet separation device enabling the copy sheet to be separated from the original microfiche sheet positively while at the same time enabling the original sheet to be maintained in position if multiple copies thereof are desired.

It is yet a further object of the present invention to provide a sheet separation device which automatically and efficiently separates a copy sheet from an original microfiche sheet after exposure of the copy through the original and feeds the separated copy to a development means in a microfiche duplicator.

The present invention accomplishes the above objects by the copyboard, the sheet registration apparatus, and the sheet separating means of the present invention. The copyboard includes a radiation-transmissive plate, particularly an ultraviolet radiation-transmissive plate, which is adapted to carry superposed thereon the original and copy sheets, the original sheet being disposed adjacent the plate and between the plate and the copy sheet, the copyboard further being linearly reciprocatable between a loading station and an exposure station.

The copyboard of the present invention is designed to carry the superposed original and copy sheets to the exposure device, and after separation of the exposed copy sheet, the copyboard returns to its initial position where an additional copy sheet may then be superposed onto the original sheet remaining on the copyboard, if multiple copies are desired.

The copyboard of the present invention is advantageous since it automatically feeds the original and copy sheets to the exposure device in superposed relationship for exposure and further since it returns the original microfiche sheet to the same location after every exposure, thereby facilitating the making of multiple copies. Means are provided in the present invention to prevent the original microfiche sheet from being separated along with the copy sheet.

The present invention also comprises a method for the direct contact exposure of a copy sheet through an original microfiche sheet, including an improved technique for feeding the original and copy sheets to an exposure device.

The sheet registration apparatus of the present invention comprises first and second stop means disposed on first and second opposite sides of a copyboard in a microfiche duplicator and movable relative to each other responsive to movement of the copyboard from the loading station to the exposure station; and third and fourth stop means disposed on third and fourth opposite sides of the copyboard and movable relative to each other responsive to the movement of the copyboard from the loading station to the exposure station.

The improved means for separating superposed thin sheets of material includes a support for the thin sheets which is provided by the copyboard; a pick-off member cooperating with the support to engage the top sheet and lift the same from the bottom sheet in response to relative movement between the pick-off member and the support; and a separator on the support interposed between adjacent portions of the sheets to facilitate engagement and lifting of the top sheet by the pick-off member.

The present invention is advantageous over the prior art in that few operating parts are required and yet the device is effective in positively separating an exposed copy sheet from an original sheet. In addition, the separation is conducted responsive to the movement of the superposed original and copy sheets past the exposure station. This automatic separation therefore provides obvious advantages while at the same time providing a simple yet effective means for feeding the separated exposed copy sheet to the development means.

Other objects and advantages of the present invention will become apparent from the following description of a preferred embodiment when taken in conjunction with the accompanying drawings.

BRIEF DESCRIPTION OF THE DRAWINGS

FIG. 12 is a right side elevational view of the exposure and clearing assembly of FIG. 9;

FIG. 13 is a diagrammatic view in elevation of the exposure and clearing assembly of FIG. 9 illustrating the sheet registration apparatus in a first position;

FIG. 14 is a diagrammatic view similar to FIG. 13 illustrating the sheet registration apparatus in a second positon;

FIG. 16 is a diagrammatic view of the sheet separation assembly of the duplicator of FIG. 1 in a first position;

FIG. 17 is a diagrammatic view similar to FIG. 16 showing the sheet separation assembly in a second position;

FIG. 18 is a diagrammatic view similar to FIG. 16 showing the sheet separation assembly in a third position.

DESCRIPTION OF THE PREFERRED EMBODIMENT

For purposes of example, the preferred embodiment of the present invention will be described herein in connection with a complete microfiche duplicator having particularly advantageous operational characteristics. It should be understood, however, that the present invention is adapted for use with any number of diverse systems not disclosed herein only for the sake of brevity.

Figure 1:
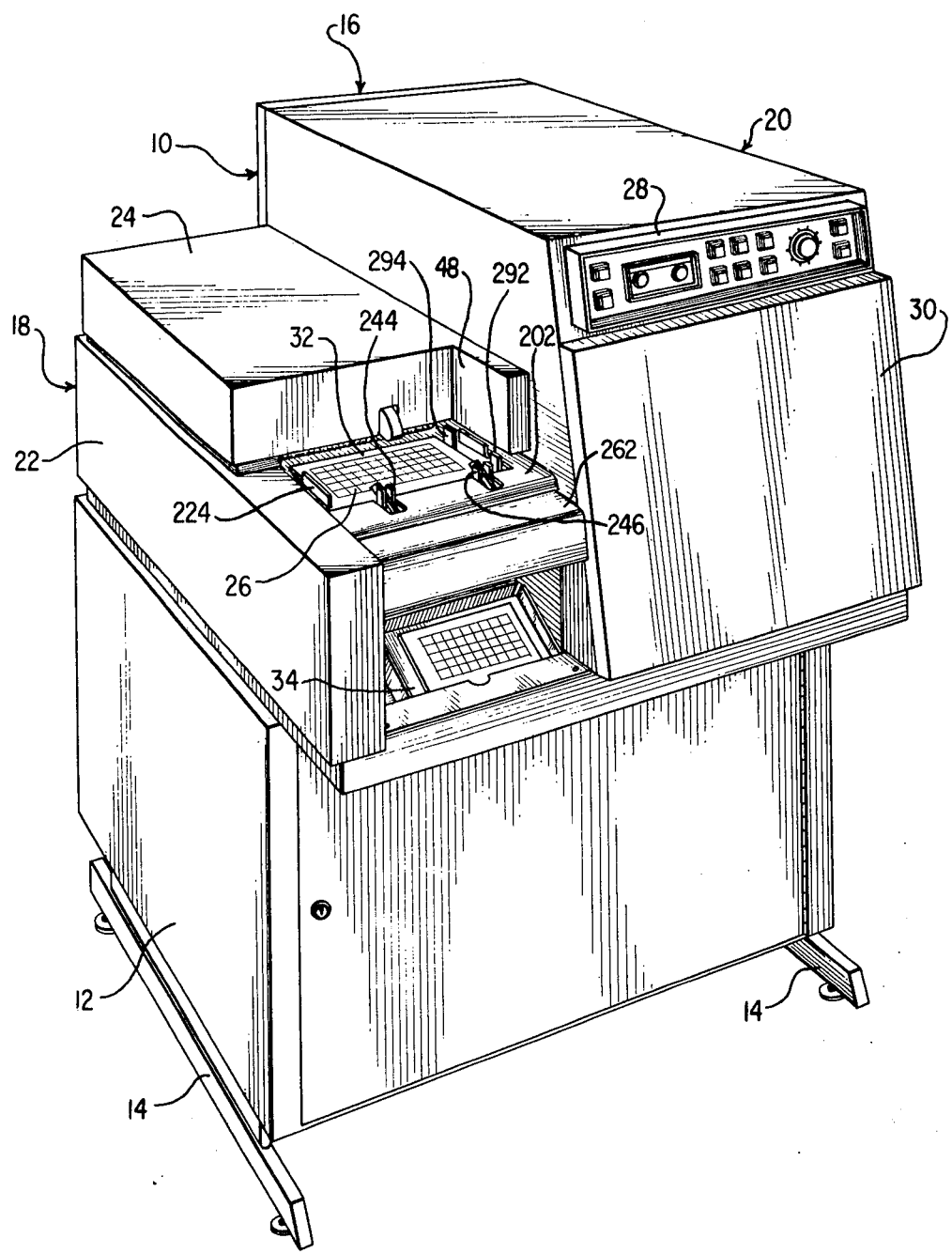
FIG. 1 is a perspective view of a microfiche duplicator in which the preferred embodiment of the copyboard assembly, the sheet registration apparatus, and the improved sheet separating means of the present invention are incorporated.

A microfiche duplicator embodying the present invention is illustrated in FIG. 1 and is housed in a cabinet structure indicated generally at 10 having a base 12 in the form of a hollow cabinet supported on legs 14. Mounted atop the base cabinet 12 is a main housing 16 divided into a reproduction compartment 18 and a control and supply compartment 20. The reproduction compartment 18 houses the main reproduction apparatus of the duplicating machine and may be provided with any number of suitable removable cover assemblies such as side and top covers 22 and 24. Cover 24 is designed to expose the copyboard assembly 26 for the reproduction apparatus to be described below such that an original micofiche sheet may be conveniently placed atop the copyboard at the beginning of a copy sequence. The remaining reproduction apparatus is shielded from view to present an aesthetically pleasing appearance complementary to the orifice area where it is to be used. A main control panel 28 is disposed on the front of the control and supply compartment 20 and facilitates the operation and sequence selection of the machine.

Before proceeding wit a detailed description of the copyboard, sheet registration means, and sheet separating means of the invention, a brief general description of the operation of the duplicating machine will be presented for purposes of clarity.

The duplicator is turned on by depressing the appropriate switch on control panel 28 whereupon the apparatus readily assumes a stand-by or ready mode for the initiation of a reproduction sequence. The ready state is indicated by the ignition of a suitable lamp on control panel 28, and thereafter an operator may conveniently insert an original microfiche sheet 32 atop the copyboard 26. With the microfiche 32 manually placed approximately in the proper position on the copyboard 26 for reproduction, a sequence initiation switch on panel 28 is actuated causing a preselected length of copy film to be advanced from a bulk film roll located within the housing behind panel 30. After the preselected length of film has been advanced from the film supply roll, the copy sheet is severed and falls atop the original sheet 32 on copyboard 26.

With the above steps completed, the copyboard assembly 26 is automatically sequenced to begin movement toward the rear of the machine, which movement causes the original and copy microfiche sheets to be brought into precise registration. As the copyboard 26 advances rearwardly, the copy sheet is exposed through the original until the entire exposure has been made. With the copyboard continuing its rearward movement, the copy sheet is automatically separated from the original sheet, and it continues its rearward movement beyond the exposure station and into a development chamber in the reproduction compartment 18. As the copy sheet advances through the development chamber, the original is brought back to the front of the duplicating machine by a rapid forward movement of the copyboard back to its original loading position.

The copy sheet continues its advancement through the developing chamber which is constructed in a generally U-shaped configuration such that the copy sheet exits from the developing chamber in a forward-going direction toward the front of the apparatus. The copy sheet then passes through a clearing station which is activated only when vesicular type copy films are used and is placed in a passive or stand-by mode for conveyance purposes only when diazo films are employed. The copy sheet is then received in a collection tray 34 located under the loading station or initial position of copyboard 26, and the sequence is completed.

If it is desired to make multiple copies of an original microfiche sheet, the above process may be repeated by selection of the appropriate control on panel 28 with more than one copy sheet being fed through the equipment at any one time as the copyboard moves back and forth between loading and exposure stations. As will become clear as the description proceeds, the present invention has the capability of making not only single or multiple copies but further may utilize diazo or vesicular film types developed in the case of diazo film with an aqueous or anhydrous developing agent supply.

Figure 6:
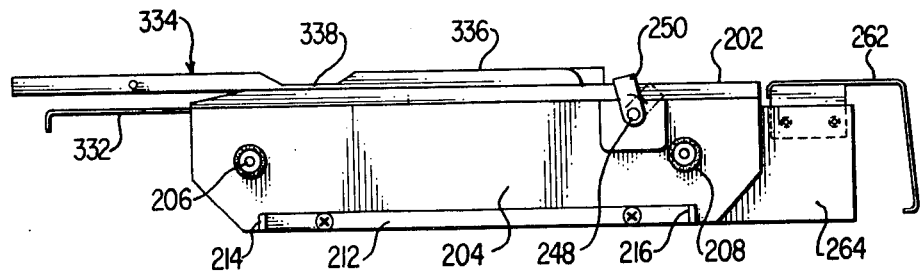
FIG. 6 is a left side elevational view of the copyboard assembly of FIG. 4.
Figure 10:
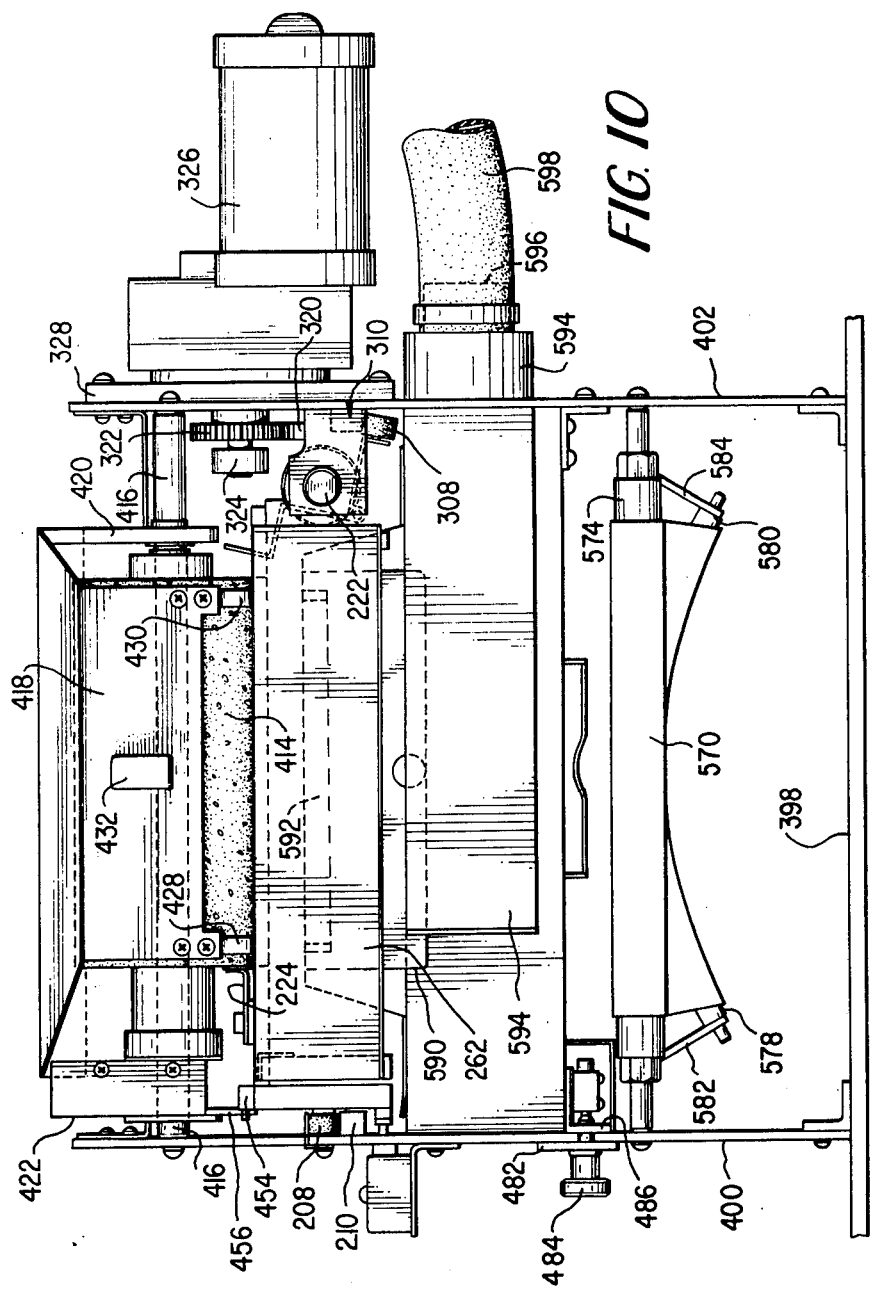
FIG. 10 is a front elevational view of the exposure and clearing assembly of FIG. 9.

A detailed description of the preferred embodiment of the invention is as follows. Referring to FIGS. 4 through 8, the copyboard assembly includes an ultraviolet transmissive plate 26 (FIG. 1) which may be made of any suitable material such as treated or coated glass designed to pass ultraviolet radiation from the exposure source of the duplicating system to the original and copy sheets resting atop the plate 26. It is also preferred that plate 26 be designed to filter as much as possible of the unwanted radiations emitted from the ultraviolet source as well as heat so as to prevent damage or deterioration of the film sheets during the duplicating process. Plate 26 is attached in an opening 200 defined by a generally rectangular copyboard housing 202 having a downwardly extending flange 204 along its left side supporting at spaced points a pair of roller bearings 206 and 208. Bearings 206 and 208 are adapted to ride along an elongated guide rail 210 (FIG. 10) mounted upon a frame member to be described below. Guide rail 210 may be of any suitable design and is preferably square in cross section as shown in FIG. 10. A microswitch trip bar 212 having a pair of protrusions 214 and 216 formed on the ends thereof is also affixed along the lower edge of side flange 204 as illustrated in FIG. 6.

A pair of linear bearings 218 and 220 are suitably attached to the right hand side of the copyboard 202 and ride along a shaft 222 fixedly secured to the frame of the duplicator housing in a longitudinal horizontal position as illustrated in FIG. 10. Attached to the top of copyboard housing 202 is a generally L-shaped fixed left side stop 224 and a suitable clamp plate 226. Also, a forward edge stop assembly, indicated generally at 236 and mounted on copyboard housing 202, includes a pair of parallel arms 228 and 230 pivotally mounted at one end to the copyboard at points 232 and 234 and similarly pivotally mounted at their other ends to an adjustable carriage plate 238. Plate 238 supports a compressible, rectangular sheet of material such as a foamed plastic or rubber composition 240 having disposed on its upper surface a thin semi-rigid sheet of plastic 242. The edge of plastic sheet 242 closest to the copyboard plate 26 overhangs the compressible element 240 by a slight amount, such as an eighth of an inch, so that the forward edge of an original microfiche sheet may be placed under the top sheet 242 and against the front side surface of element 240. The aforementioned structure is illustrated diagrammatically in FIGS. 16, 17 and 18. A spring 239 is held in compression between the copyboard housing 202 and the slotted right end of carriage plate 238 causing the same to be biased toward the end of a screw 241 adjustably positioned by the rotation of a knob 243. In this manner, the longitudinal position of assembly 236 with respect to copyboard plate 26 may be readily adjusted by rotating knob 243 thereby swinging the parallelogram formed by arms 228 and 230 and carriage plate 238 in the plane of the copyboard housing 202.

To facilitate the insertion of an original microfiche sheet atop the copyboard plate 26, a pair of front stop members 244 and 246, each having a pair of spaced, upright tangs, are attached to a rotatable shaft 248 journaled on the copyboard assembly under the copyboard housing 202. Shaft 248 extends through the side flange 204 and terminates in a rectangular arm 250 which cooperates with a spring 252 to bias the shaft 248 for rotating stop members 244 and 246 to an upright position shown in FIG. 1. Also disposed between the upright tangs of each of the stops 244 and 246 are angulated retaining members 254 and 256 which ride within grooves 258 and 260, respectively, in the copyboard housing 202. In this manner, engagement of the upper end of arm 250, as the copyboard housing 202 moves linearly toward the rear of the duplicating apparatus, causes the rotation of shaft 248 and the retraction of stop members 244 and 246 into a pair of accommodating recesses in the housing surface. At the same time, retaining members 254 and 256 are swung back and down to nest between the tangs of the stop members such that both front stop assemblies are withdrawn from their biased upwardly protruding positions as shown and brought flush with the surface of housing 202.

Figure 4:
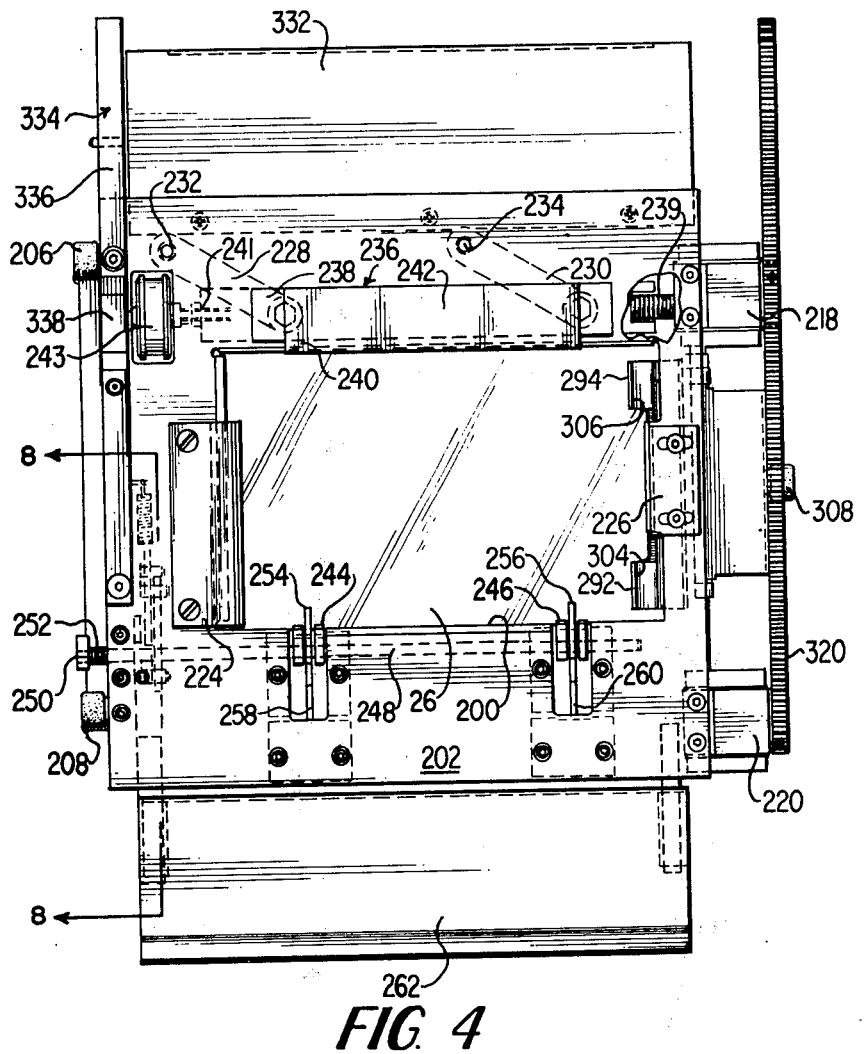
FIG. 4 is a plan view of the copyboard assembly of the duplicator of FIG. 1.
Figure 5:
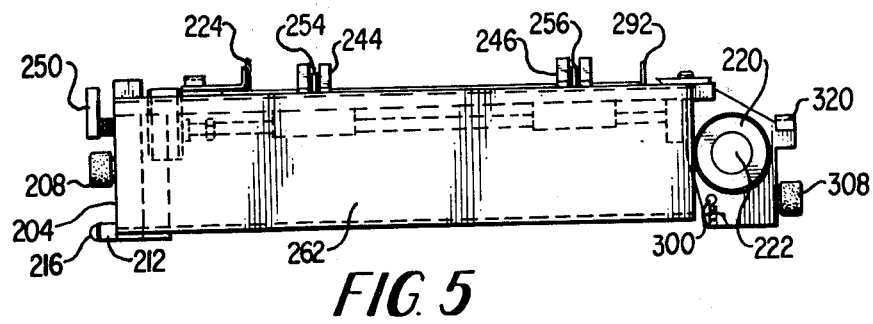
FIG. 5 is a front elevational view of the copyboard assembly of FIG. 4.

An elongated lever 262 of generally L-shaped cross section is connected to the front of the copyboard assembly housing 202 at each end by members 264 (FIG. 8) and 266 (FIG. 7) which are pivotaly secured to the underside of the copyboard housing 202. Referring to FIG. 8, member 264, which is disposed on the left side of lever 262 as visualized in FIG. 4, is pivotally mounted at point 268 and is connected through an arm 270 and a pin 272 to a triangular link 274 rotatable about pivot 276. Link 274 is biased to the position illustrated in FIG. 8 by spring 278 defines a slot 280 which accommodates pin 272 of arm 270. The apex of link 274 is pivotally secured to a rectangular link member 282 defining a slot 284 accommodating the pin 286 of a generally triangular eccentric arm 288 fixedly secured to the shaft 248 of stop members 244 and 246. Eccentric 288 assumes a rest position as illustrated in FIG. 8 which may be adjusted by the setting of a small screw 290 through the copyboard housing 202.

In operation, downward pressure exerted upon lever 262, as by the hand of an operator, causes the rotation of member 264 about point 268 in a counter-clockwise direction. The counter-clockwise movement of member 264 is transmitted to the triangular link 274 causing the same to rotate clockwise about point 26. Link member 282 is thus moved rearwardly to rotate the eccentric member 288 counter-clockwise thus rotating shaft 248 and causing the retraction of stop members 244 and 246 as previously described. In this manner, at the start of a reproduction sequence, an operator may merely depress lever 262 causing the aforedescribed linkages to rotate shaft 248 and retract stops 244 and 246 so as to facilitate the insertion of an original microfiche sheet with the leading edge thereof resting against the compressible member 240 under the overhanging front edge of plastic sheet 242. Thereafter, lever 262 may be released whereby stops 244 and 246 revert to their biased upright positions so as to properly orient the original microfiche sheet longitudinally of the copyboard housing 202. Further, as the original microfiche sheet is placed by an operator atop plate 26 adjacent left fixed stop 224, the duplicator will automatically thereafter provide positive lateral alignment of the original sheet by the operation of a pair of laterally movable right stops 292 and 294.

Figure 7:
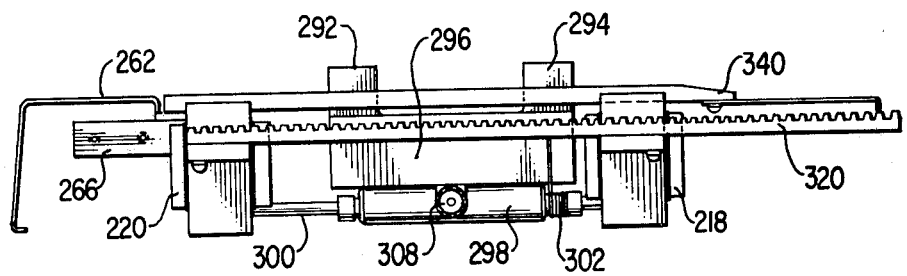
FIG. 7 is a right side elevational view of the copyboard assembly of FIG. 4.
Figure 8:
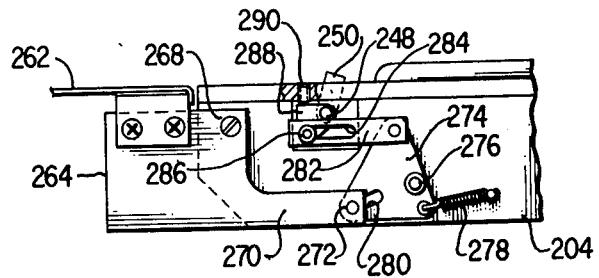
FIG. 8 is a sectional view in detail taken along line 8—8 of FIG. 4.

Referring to FIGS. 7 and 10, stops 292 and 294 protrude from the upper surface of a generally Z-shaped bent plate 296 which has secured centrally thereto an elongated collar 298 which is journaled for rotation about a shaft 300 suitably affixed to the copyboard housing 202. Plate 296 is biased by a spring element 302 in a counter-clockwise direction as visualized in FIG. 10, thus tending to bring stop members 292 and 294 to an upright position against a pair of recesses 304 and 306 formed in the copyboard plate 26. A cam roller 308 is centrally disposed upon the lower distal arm of member 296 and cooperates with a linear cam 310 for rotating member 296 and thus causing the movement of stops 292 and 294 with respect to the fixed left stop member 224 as the copyboard assembly moves along its linear path of travel. As shown in FIG. 12, cam 310 has a generally flat surface 312 and a flat recessed surface 314 such that stop members 292 and 294 are normally held in a position away from left stop member 224 and move toward stop 224 as roller 308 rides along cam 310 and into recess 314.

A gear rack 320 is attached along the right side of copyboard housing 202 and cooperates with a circular gear 322 which is driven through a slip clutch 324 by a reversible DC motor 326. Motor 326 is attached at plate 328 to the frame member of the exposure assembly to be described below. Thus, as the DC motor 326 rotates gear 322, the copyboard assembly is moved linearly along a longitudinal path on roller bearings 206 and 208 and linear bearings 218 and 220.

In operation, after an original microfiche sheet has been inserted over the copyboard plate 26 as described above, a preselected length of copy film is supplied by the film feed and cutting assemblies 44 and 46 (FIG. 2) and falls atop the original sheet on the copyboard housing 202. Details of the film feed and cutting assemblies 44 and 46 have been omitted for the sake of brevity as they form no part of the invention and any type of film feed and cutting apparatus known in the art could be employed. The copy film could even be hand cut and placed by hand upon the copyboard.

After placement of the copy film on the copyboard, actuation of DC motor 326 causes the copyboard assembly to move linearly toward the rear of the duplicator whereupon roller 308 rides along cam 310 into recess 314 causing the rotation of stops 292 and 294 toward the fixed left stop 224 to move both the original and copy sheets against the stop member 224 for precise lateral registration thereof. As will be more clearly appreciated as the description proceeds, after roller bearing 308 traverses the recessed groove 314 in cam 310 it will ride up onto surface 312 thereby retracting stops 292 and 224 from interference with the exposure roller (to be described below) as the copyboard assembly continues its rearward movement. Likewise, an elongated rectangular cam 330 affixed to the left side of the frame of the exposure assembly cooperates with arm 250 of shaft 248 such that the same engages cam 330 and is rotated thereby as the copyboard moves through the exposure station for retracting upright stops 244 and 246 to preclude damage to the exposure assembly as the copyboard completes its rearward movement.

Also carried on the copyboard housing 202 is a flat guide plate 332 and a linear cam 334 aligned longitudinally along the left edge of the housing 202 and similar in configuration to that of linear cam 310. Cam 34 thus defines a main, flat cam surface 336 having formed therein a notch-like recess 338 for cooperation with the roller bearing of a copy sheet pick-off assembly to be described below. In addition, the forward edge portion of copyboard housing 202 is tapered at surface 340 (FIG. 7) adjacent guide plate 332 for cooperative engagement with a soft pressure roller on the rearward pass of the copyboard assembly during a reproduction sequence.

The exposure station of the duplicating apparatus is illustrated in FIGS. 3 and 9 – 12 and includes a frame formed of a base plate 398 having a pair of side plates 400 and 402 affixed thereto in spaced parallel relationship. Each of the side plates 400 and 402 is generally rectangular in configuration and has a pair of extension ears 404-406 and 408-410, respectively, extending orthogonally from an upper rear corner thereof. Guide rail 210 of the copyboard assembly is horizontally secured to frame plate 400 as shown in FIG. 10 as is the support rod 222 for linear bearings 218 and 220. Further, motor 326 for driving the copyboard assembly is attached at plate 328 by suitable means such as screws to the side plate 402 as shown in FIGS. 10 and 12. A suitable flat, rectangular plate 412 extends between and is rigidly secured to ears 406 and 410 of side plates 400 and 402, respectively, to provide the necessary structural rigidity for the entire frame assembly.

A soft roller 414, constructed of any suitable material such as solid or foam rubber, is mounted for free rotation about a transverse shaft 416 connected between plates 400 and 402. Roller 414 is disposed for engagement with the upper surface of the copyboard assembly housing 202 as the same is moved rearwardly of the duplicating apparatus by motor 326 to maintain the original and copy microfiche sheets in firm contact against each other and against the surface of the copyboard plate 26 during movement of the same. Cooperating with the soft roller 414 is a copy film drag assembly which includes a generally curved support member 418 frictionally secured to the hub of roller 414 by a pair of spaced leg members 420 and 422. A stop member 424 protruding from the inside surface of flange 406 of frame side plate 400 cooperates with a recessed groove 426 in leg member 422 to define the limits of rotary movement of the drag cover 418. As shown in FIG. 10, a pair of thin, rectangular strips 428 and 430, of rubber or other resilient material, are secured to the lower front corners of member 418 and cooperate with the copyboard assembly and the soft roller 414 to engage the forward edge of a copy sheet and exert a drag force thereupon to shift the copy sheet against stop members 244 and 246 for precise longitudinal registration of original and copy sheets of microfiche as the copyboard assembly moves rearwardly of the duplicating apparatus. Also disposed on the front surface of member 418 is a centrally protruding nose 432 which gently engages the exposed surface of the copy sheet to correct for improper alignment caused by any film curl existing in the original copy film sheets.

Thus, as the copyboard housing 202, containing both original and copy sheets, begins to move rearwardly of the duplicator, the inclined forward surface 340 of the copyboard housing will engage the peripheral surface of soft pressure roller 414 causing the same to be rotated as the copyboard continues its forward advancement. Since cover member 418 is in frictional engagement with the hub of pressure roller 414, the initial rotation of the roller caused by the movement of the copyboard housing rotates the cover in a clockwise direction as visualized in FIG. 11 to bring the rubber drag members 428 and 430 downwardly into contact with the top surface of the copyboard. At the same time, the protruding nose 432 of plate 418 swings down over the center of the advancing copy and original sheets flatening the curl thereof and gently urging the same against the surface of plate 26.

Upon continued rearward movement of the copyboard assembly, stop 424 engages the rear edge of groove 426 precluding further rotation of plate 418 as the pressure roller 414 continues to be moved by the advancing copyboard housing 202. The drag members 428 and 430 thereafter engage the forward edge of the copy sheet causing the same to be slid into engagment with stops 246 and 244 assuring precise registration of the copy sheet with the original microfiche carried by the copyboard. Further advancement of the copyboard assembly causes the registered copy and original microfiche sheets to be brought under the pressure roller 414 maintaining the microfiche sheets in firm contact with each other and with the top surface of the transmissive plate 26 for exposure of the copy sheet as will be described below.

Figure 9:
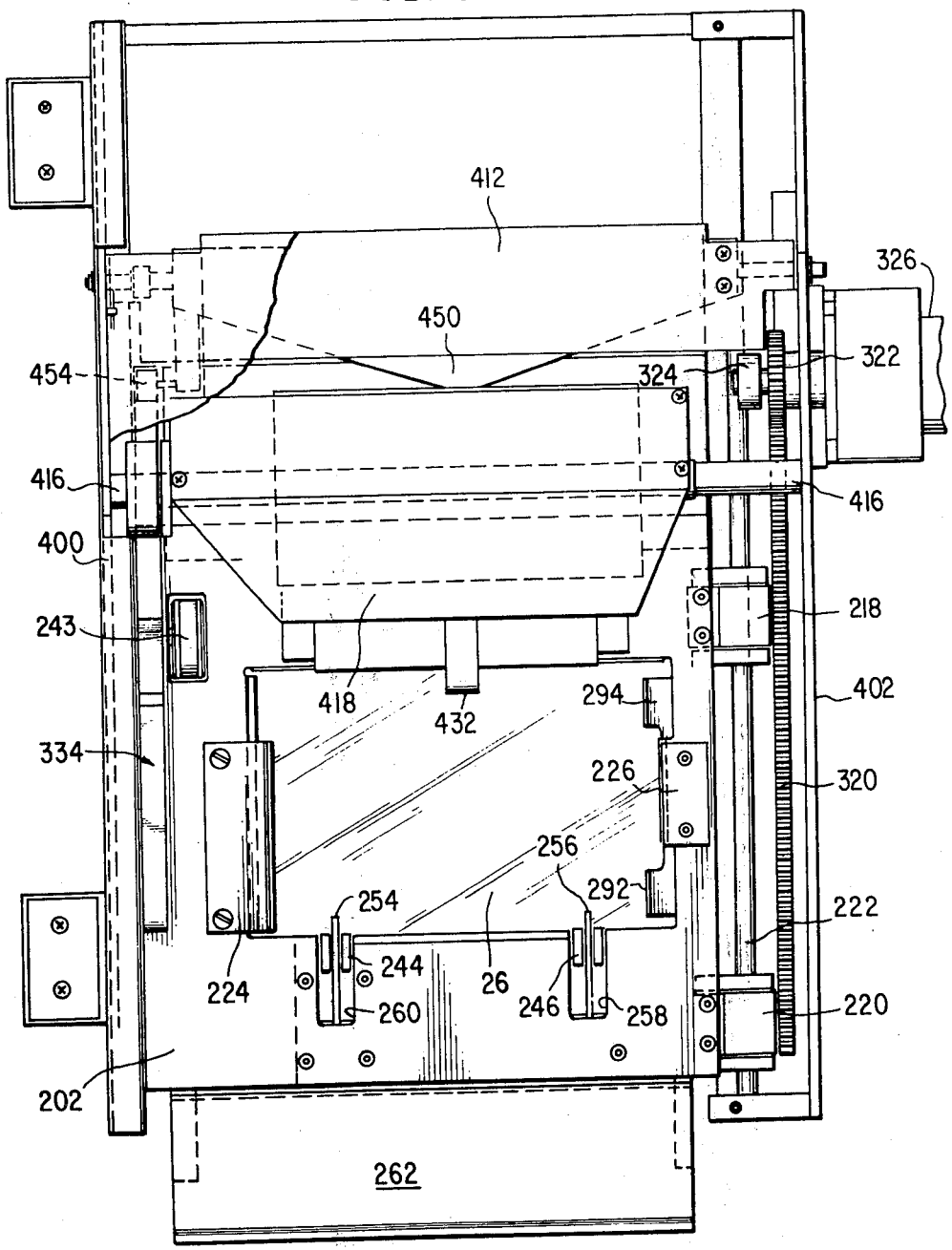
FIG. 9 is a plan view of the exposure and clearing assembly of the duplicator of FIG. 1.

A generally triangular flat copy sheet pick-off plate 450 is pivotally secured along its rear edge on a shaft 452 mounted between plates 400 and 402 of the exposure frame assembly. In this manner, the apex of the triangular plate 450 is centrally disposed with respect to the copyboard assembly and points to the front of the duplicating apparatus as illustrated in FIG. 9. A roller bearing 454 is attached to the distal end of a linkage arm 456 having its proximal end rigidly secured to the triangular pickup plate 450 at its left side as viewed in FIG. 10. Roller bearing 454 cooperates with linear cam 334 carried upon the copyboard housing 202 to lift the apex of the triangular pick-off plate 450 slightly away from the copyboard surface until the forward edge of the copy sheet has just passed the pressure roller 414. Thereafter, roller bearing 454 will ride into recess 336 in cam 334 enabling the apex of the pick-off plate 450 to engage the top surface of the thin plastic sheet 242 covering the compressible sponge-like element 240. Since the forward edge of the original microfiche sheet is inserted below the overhanging edge of plastic sheet 242, and the copy microfiche sheet rests atop sheet 242, the apex of the pick-off plate 450 will cause element 240 to be compressed allowing the pick-off plate to ride under and lift off the forward edge of the copy sheet as the same is further advanced by the continued movement of the copyboard assembly. Also, as the roller bearing 454 rides out of the recess 336 and onto the surface 338 of cam 334, the apex of pick-off plate 450 is raised above the copyboard surface thereby lifting the copy sheet away from the original microfiche sheet to simply, effectively and positively separate the two as the copyboard housing 202 progresses to the rear of the duplicating apparatus.

As noted briefly above, after the copy sheet has been separated from the original, the exposed copy thereafter proceeds to a developing station while the original microfiche sheet is transported upon the copyboard back to the front of the duplicator. In order to preclude fouling of the original sheet upon the forward-going return of the copyboard assembly, which, for example, may be caused by the presence of a fold or curl in the original microfiche sheet, an elongated rod-like retaining roller 458 is pivotally secured to the underside of the triangular pick-off plate 450 slightly below and parallel with shaft 452 to engage the original microfiche sheet and maintain the same in a generally flat posture upon the copyboard surface. Thereafter, as the copyboard carriage returns to its initial position, the roller 458 assures that the same will smoothly pass below the soft pressure roller 414 without becoming damaged.

Figure 11:
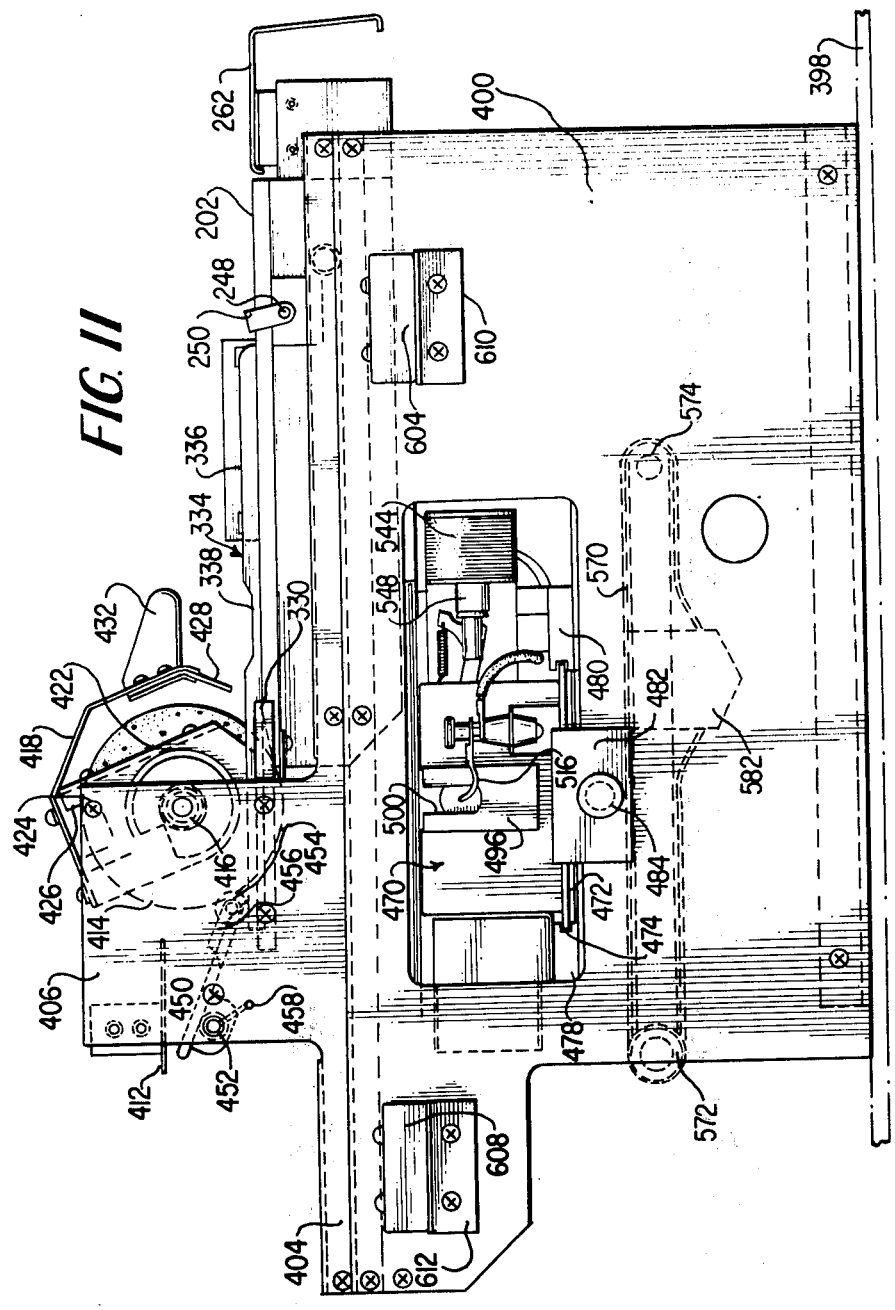
FIG. 11 is a left side elevational view of the exposure and clearing assembly of FIG. 9.
Figure 15:
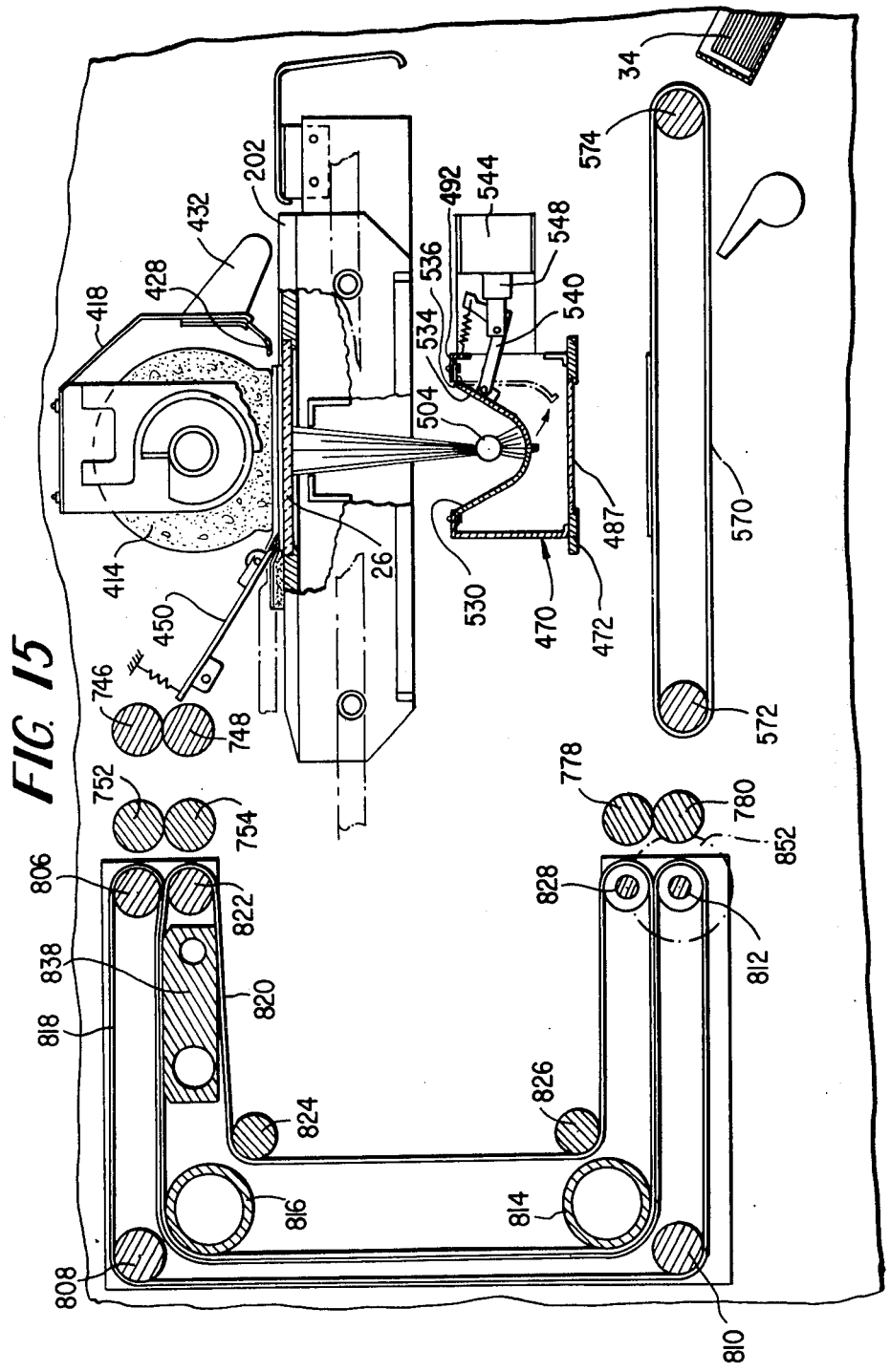
FIG. 15 is a diagrammatic view in section of the exposure and clearing assembly and developing assembly of the duplicator of FIG. 1.

An exposure lamp assembly indicated generally at 470 FIGS. 11 and 15) is disposed transversely of the duplicator apparatus between frame plates 400 and 402 and includes a base plate 472 of generally flat, rectangular configuration adapted to be slidably secured within grooves 474 and 476 formed in a pair of transverse mounting brackets 478 and 480, respectively, attached between plates 400 and 402. A generally L-shaped flange 482 is attached to base 472 and carries a threaded bolt 484 adapted to be cooperatively received within a mounting bracket 486 attached to plate 400. The exposure lamp assembly 470 is thus selectively removable and may be secured in position directly underneath the soft pressure roller 414 by sliding base 472 along grooves 474 and 476 and thereafter engaging bolt 484 with bracket 486. A rectangular opening is centrally defined by base plate 472 over which is disposed a light transmissive heat filter element 487 which may be constructed of any suitable material well known to those skilled in the art.

Mounted within the lamp assembly 470 is an elongated tubular ultraviolet lamp 504 which is preferably a 1000 watt ultraviolet mercury vapor lamp. Operating potential for lamp 504 may be supplied from a suitable conventional power source (not shown) through jacks (not shown) mounted upon the exposure and clearing assembly frame.

A generally parabolic elongated reflector assembly is disposed under lamp 504 and includes a first polished metal reflector element 530 secured, as by screws, at its upper end to a lip 532 formed along the top edge of flange 494. A second polished metal reflector element 534 is secured through hinge 536 and suitable screws to a lip formed along the upper edge of flange 492. Reflector element 534 is connected at is lower edge, as viewed in FIG. 15 through a pivot pin to a generally L-shaped connecting link 540 having the shorter arm thereof secured through tension spring to the flange 492. A solenoid 544 is mounted to flange 492 and has its plunger 548 pivotally connected to the elbow of L-shaped link member 540 and receives a control signal at its winding through a pair of conventional plugs (not shown) which cooperate with complementary jacks (not shown) affixed to the exposure assembly frame. In this manner, actuation of solenoid 544 causes the retraction of plunger 548 which acts through link member 540 to swing the reflector element 544 away from lamp 504 to allow ultraviolet radiation to pass through heat filter 487 for illuminating the upper surface of an endless conveyor belt 570 for clearing vesicular type copy films.

Conveyor belt 570 is constrained between a pair of horizontally aligned spaced rollers 572 and 574 extending transversely between plates 400 and 402 and journaled for rotation thereupon. A gear 576 (FIG. 12) is attached to the inner end of roller 572 for cooperative engagement with a conventional (not shown) motor which drives the conveyor belt 570 at the desired speed. Conveyor belt 570 may be constructed of any suitable material such as rubber impregnated fiberlgass and is maintained in its desired lateral position by a pair of inclined rollers 578 and 580 which are pivotally disposed upon angulated brackets 582 and 584, respectively, for engagement with the inner surface of belt 570 below rollers 572 and 574 as shown in FIG. 10.

An inverted generally U-shaped collimator support tray 590 (FIG. 10) is slidably disposed between frame members 400 and 402 above the exposure lamp assembly 470 for supporting a suitable honeycomb collimator between the ultraviolet lamp source 504 and the pressure roller 414. The honeycomb collimator 592 may be removed from its operative position between lamp 504 and roller 414 by longitudinal movement of tray 590, if desired.

An exhaust duct 594 of generally rectangular cross section extends laterally across the exposure and clearing assembly in front of the lamp assembly 470 and has suitable openings adjacent the lamp assembly for exhausting the heated air surrounding the lamp from the apparatus. Duct 594 communicates through a circular connector 596 to an exhaust hose 598 connected with a conventional exhaust blower (not shown).

A pair of microswitches 604 and 608 are mounted upon L-shaped brackets 610 and 612, respectively, secured to plate 400 of the exposure frame assembly such that the actuating arms of microswitches 604 and 608 protrude through openings in the plate wall for selective engagement and actuation by protrusions 214 and 216 carried on flange 204 of the copyboard assembly as shown in FIG. 6.

After separation of the copy sheet from the original sheet on the copyboard assembly by the pick-off plate 450, the copy sheet is advanced by roller sets 746–748 and 752–754, which are continuously driven by conventional means (not shown), into the developing chamber 800. The developing chamber can be provided by many conventional developing apparatus, and it will be only briefly described here because it forms no part of the invention. within the developing chamber 800 are a plurality of rollers 806, 808, 810, 812, 814, and 816 supporting endless belts 818 and 820 which are continuously driven by conventional drive means (not shown) and transport the exposed copy sheet through the developing chamber 800.

Within the developing chamber 800 are heating elements provided by heating block 838, and others if desired, which provide the necessary heat to develop the vesicular film, when that film is used or heat the ammonia atmosphere within the chamber when diazo film is used. The heat can be provided by conventional electrical means and controlled by conventional thermoswitches. The ammonia atmosphere can be provided by conventional feeding means for feeding metered quantities of anhydrous ammonia and water into a receiving tray (not shown) in the bottom of the developing chamber 800.

After being transported through the developing chamber 800 by belts 818 and 820, the developed film is advanced by roller set 778 and 780, driven by conventional means (not shown), to conveyor 570. Conveyor 570 conveys the developed diazo film to receiving tray 34 withut further processing. If the duplicator is set for vesicular film, the reflector element 534 will be swung to its retracted position, permitting light from lamp 504 to pass through heat filter 487 and shine on conveyor 570. In this mode, the film is cleared as it passes beneath the light assembly 470.

The duplicator described in connection with the present invention includes a control network housed within the cabinet and constructed with conventional switching assemblies, such as relays, to provide the desired control sequence of operating the system. The particular circuit details of that control system may be of any suitable design accomplishing the sequence to be described below. In view of the great number of variations in the details of the circuit control network, which are well known to those of ordinary skill in the art, no attempt will be made herein to describe any particular circuit in detail, for the sake of brevity. However, the desired control sequence will be fully presented in accordance with the preferred mode of operation of the present invention as the description proceeds.

Figure 2:
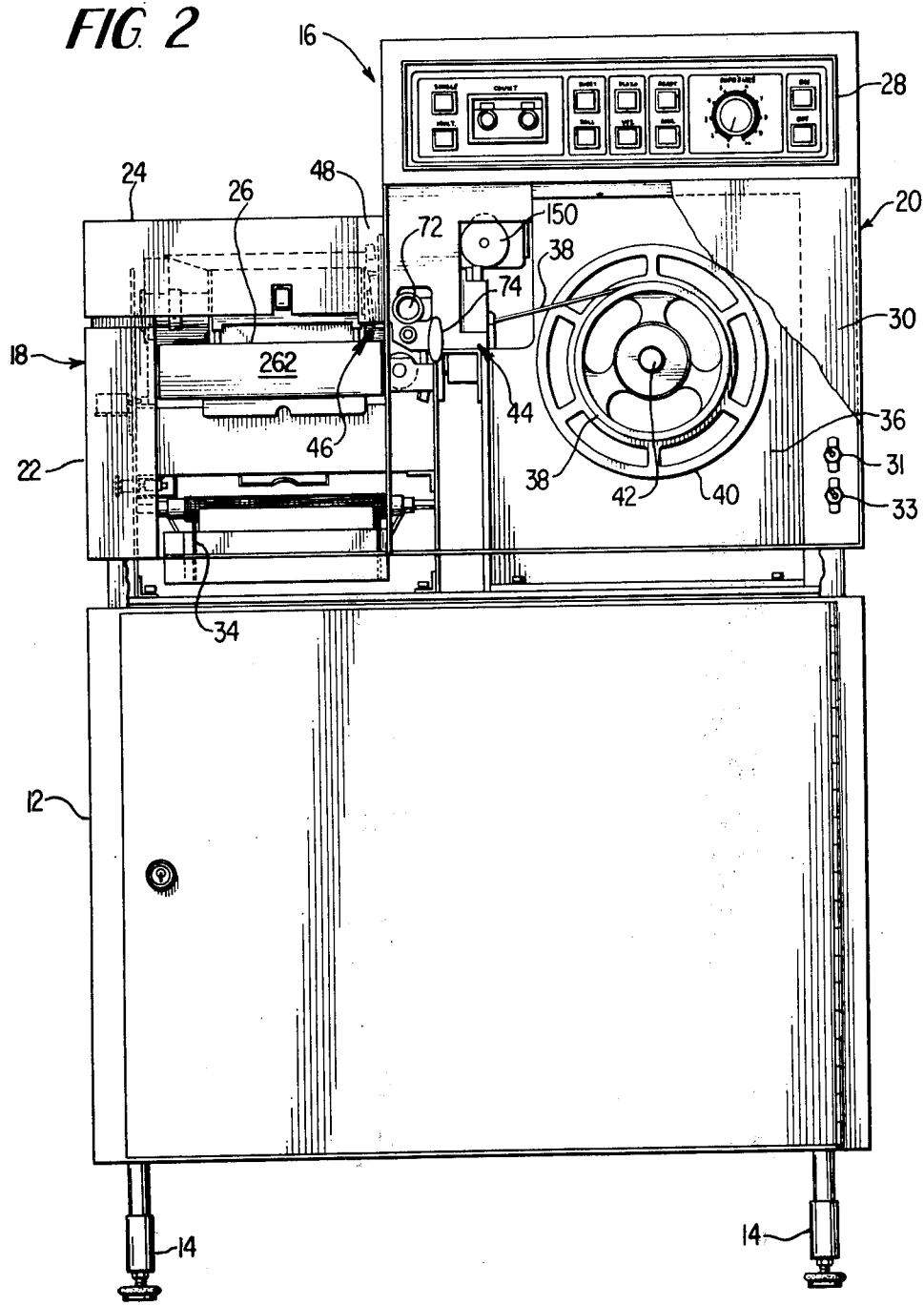
FIG. 2 is a front elevational view of the duplicator of FIG. 1 with parts broken away.
Figure 3:
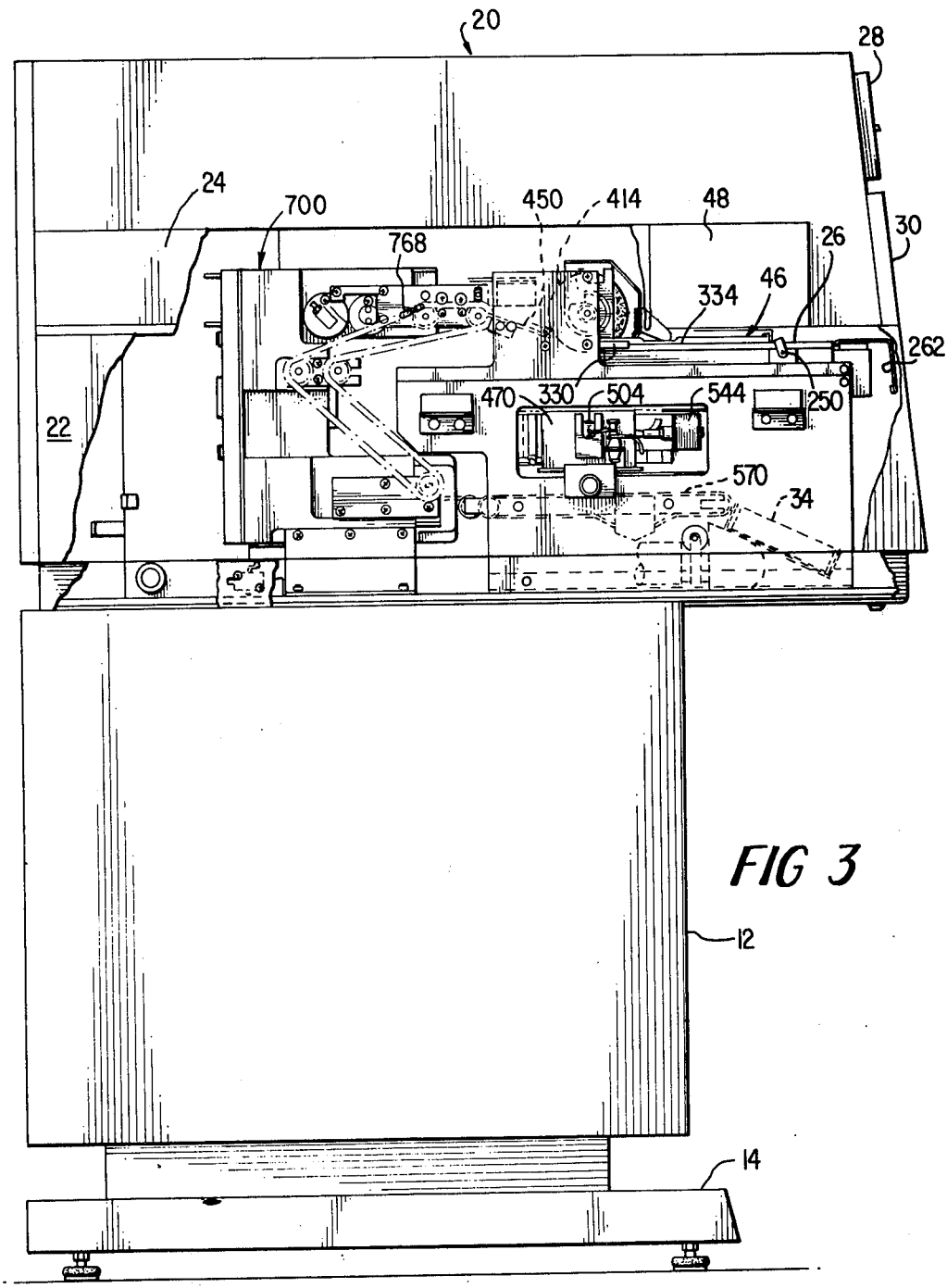
FIG. 3 is a left side elevational view of the duplicator of FIG. 1 with parts broken away.

Prior to the beginning of a particular reproduction sequence, a roll 38 of diazo vesicular film is inserted within compartment 30 and threaded through the film feed and cutting assemblies 44 and 46 (FIG. 2). The microfiche duplicator described in connection with the present invention is adapted to make copies using either of these film types, dependent upon the position of a first selector switch 31 located within compartment 36. Diazo and vesicular lamps on panel 28 apprise the operator of the position of switch 31 when the duplicator is on. If a diazo film is used, and switch 31 is placed in its diazo selector position, the following sequence of events occurs as the "on" push button of panel 28 is depressed.

Initially, operating potential is fed to a cooling blower in the duplicator housing and to the heating elements of the developing assembly. In addition, the developer drive motor (not shown) is turned on causing the movement of the developer belts 818 and 820 as well as the clearing conveyor 570. As the temperature within the developing chamber reaches approximately 160° F., the heating elements are appropriately cycled by a thermoswitch to maintain this temperature. It is noted that the vesicular heating elements will be controlled to maintain the temperature of the thermally conductive block 838 at approximately 300° F when the machine is processing vesicular film.

At the same time, a metered amount of water and anhydrous ammonia is fed into the developer to develop the diazo film. The metering means are not shown as they can be provided by any number of conventional systems and form no part of the present invention.

The exposure lamp 504 is then supplied with operating potential, and the ready lamp on control panel 28 is turned on. The microfiche duplicator is thus placed in a stand-by mode ready to receive an original microfiche sheet for the making of a copy.

A second switch 33 in housing 36 may be placed in either of two positions corresponding to the use of roll or cut sheet copy film in the duplicator. With switch 33 in the sheet supply position, the sheet indicator lamp on control panel 28 is lit, and the film advance and cutting assemblies 44 and 46 are disabled to preclude inadvertent advance of the film from roll 38. With switch 33 in the roll feed position, an operator may depress either the single or multiple selector push buttons, the number of multiple copies being preselectable by the setting of the counter of control panel 28. If the single copy push button is depressed, a motor in the film feed and cutting assemblies will become energized, causing a precisely measured length of copy film to be fed from the supply roll 38 and thereafter severed by a blade in the cutting assembly 46, so as to fall atop the original microfiche sheet which has been previously inserted over the copyboard plate 26.

DC drive motor 326 of the copyboard assembly will then be energized, whereupon the copyboard will be moved forward at a rate dependent upon the setting of the exposure dial on control panel 28. The exposure dial controls the power to the motor 326, by conventional means such as a rheostat, and thus the speed of the motor. The amount of exposure to the light is controlled by the speed of the copyboard through the exposure assembly. Microswitches 608 and 604 of the exposure and clearing assembly coact with protrusions 214 and 216 of the copyboard to detect the limits of movement thereof as the reproduction sequence progresses. Specifically, microswitch 608 detects the limit of forward movement of the copyboard, causing drive 326 to be reversed through conventional switching relays (not shown). As motor 326 rotates in the reverse direction, the copyboard is returned to the front of the duplicator at a faster speed than it moved to the rear of the duplicator. The copy sheet thereafter continues its advancement through the developing chamber and back toward the front of the duplicator where it is conveniently delivered to the receiving tray 34. The original microfiche sheet is maintained on the copyboard and is returned therewith for the making of additional copies if so desired.

If the multiple copy selector button is depressed on control panel 28, the above sequence is repeated for the desired number of copies, with the copyboard carrying the original sheet back and forth along its linear path of travel as each exposed copy sheet is cut and fed through the exposure and developing stations.

To further clarify the operation of the microfiche duplicator, reference will now be made to the diagrammatic views of FIGS. 13 through 18. Referring to FIGS. 13 and 14, at the start of a reproduction sequence, an original microfiche sheet 0 is placed atop the copyboard plate 26 between the fixed left stop 224 (FIG. 1) and the retracted right hand stops 292 and 294. As the operator inserts the original microfiche sheet on to the copyboard, lever 262 is depressed downwardly causing front stops 244 and 246 to be retracted flush with the copyboard surface. The leading edge of the original sheet is thereafter located underneath the thin plastic separator sheet 242 and against the front side of the compressible sponge-like element 240. Release of lever 262 thereafter returns the front stops 244 and 246 thereafter returns the front stops 244 and 246 to their upright positions shown in FIG. 1 thereby capturing the original sheet in its proper longitudinal position on the copyboard.

A measured and cut length of copy film C from supply roll 38 is thereafter dropped onto the copyboard approximately three-eighths of an inch forward of the stops 244 and 246 and between the left and right stop members. Thus, the copy sheet drops onto the copyboard with its leading edge above the plastic separator element 242 enabling positive separation of the copy and original sheets after exposure.

As the copyboard begins its forward travel, the cammed right hand stop members 292 and 294 move toward the fixed left stop 224, as controlled by roller 308 and cam 310 (FIG. 10). Stops 292 and 294 thus move both the original and copy sheets against stop 224 to provide positive lateral registration therebetween.

Further forward travel of the copyboard causes the inclined leading edge 340 thereof to engage the soft pressure roller 414 causing the same to rotate clockwise as visualized in FIGS. 13 and 14. The frictional engagement of carrier plate 418 with pressure roller 414 causes the same to rotate clockwise so as to lower the rubber drag elements 428 and 430 against the copyboard surface as shown in FIG. 14. Nose member 432 also moves downwardly against the copyboard so as to flatten the film and remove the curl in the copy sheet to provide accurate registration as the copyboard advances. Continued movement of the copyboard causes the rubber drag elements 428 and 430 to engage the copy sheet C to slide the same against stops 224 and 246, completing the registration sequence.

Both the cammed right hand stops 292 and 294 and stops 244 and 246 maintain their upright positions until the copy and original sheets are captured by the pressure roller 414. Thereafter, and in response to continued forward movement of the copyboard assembly, the cammed right hand stops 292 and 294 are retracted to their rest positions to assure clearance with the end of the pressure roller 414. Similarly, the forward movement of the copyboard causes the engagement of arm 250 with stationary cam 330 for retracting stops 244 and 246 to their flush or nested positions within the top surface of the copyboard so that they will pass underneath roller 414 without damaging the same.

As the registered original and copy sheets pass under pressure roller 414, a compressive force is exerted thereagainst causing both sheets to be maintained in firm contact with each other and with the copyboard plate 26 for accurate exposure. As shown in FIG. 15, the ultraviolet radiation from lamp 504 is directed through a suitable slit aperture having a width somewhat less than the flat section of the pressure roller 414 compressed against the glass. In this manner, the copy sheet C is securely held over original sheet O for assuring distortion-free exposure of the copy as the copyboard continues its forward travel.

As the copy sheet C is exposed, and passes beyond roller 414, it is separated from the original sheet O by the pick-off plate 450 shown diagramatically in FIGS. 16 through 18. As described above, the original sheet O is placed in position on the copyboard so that the leading edge thereof is below the plastic separator sheet 242. Also, the copy sheet C is aligned with the original such that its leading edge is above the separator sheet 242 as shown. When the copyboard moves forward beneath the pressure roller 414, the soft foam material 240 supporting the separator sheet 242 is compressed so that good contact between the master or original and copy sheet is attained. As the separator 242 exits from the pressure roller 414, the foam sheet 240 returns to its original shape causing the leading edges of the original and copy sheets to be slightly separated. Further forward travel causes the roller bearing 454 of the pick-off plate 450 to ride into recess 336 of cam 334 enabling the pick-off plate to be pivoted against the separator sheet 242. As plate 450 moves downwardly, the tapered leading edge thereof compresses the foam support sheet 240 enabling the apex of the pick-off plate to ride under the leading edge of the copy sheet C. As the copyboard continues its forward travel, the copy sheet is caused to ride up on the pick-off plate 450 with cam 334 acting through roller 454 to raise the pick-off plate away from the copyboard surface to preclude damaging the original sheet as it moves thereunder. The original sheet remains under the separator sheet 242 while the copyboard finishes its forward travel and thereafter returns to its start or loading position shown in FIG. 1.

Referring again to FIG. 15, the separated copy sheet C is passed above pick-off 450 and is thereafter guided between driven rollers sets 746–748 and 752–754 into the developing chamber. The advancing copy sheet is thereafter captured between belts 818 and 820 within the chamber for transporting the copy sheet and developing the exposed image therein. As noted above, if the copy sheet is a diazo film the copyboard will be exposed to ammonia, water vapor and an elevated temperature of approximately 160° F., causing the development of the exposed image. If the copy sheet, on the other hand, is a vesicular film, the same will be developed by 300° temperature of block 838 in the upper leg of the developing chamber. Of course, in the vesicular mode, the anhydrous ammonia solenoid valve will be deenergized, as will be the liquid metering assembly, such that the copy sheet is merely exposed to heat for affecting development thereof. The developed copy sheet is passed from the lower leg of the development chamber through driven rollers 778 and 780 and onto conveyor belt 570.

Conveyor belt 570 transports a developed diazo copy to the receiving tray 34 and also acts as a clearing station for a developed vesicular copy. In the vesicular mode, preselected by switch 31, solenoid 544 is energized to rotate reflector element 534 to the position shown in dashed lines in FIG. 15. With reflector element 534 swung to its retracted position, light from lamp 504 passes through heat filter 487 and shines on the upper surface of conveyor 570. As the developed vesicular copy sheet passes under the lamp assembly 470, the light from lamp 504 causes the same to be cleared, thus fixing the exposed and developed image of the original microfiche.

It can be appreciated that the copyboard assembly and sheet feed method of the present invention provides numerous advantages over the prior art in that it facilitates the reproduction of plural copies of film and enables both original and copy sheets to be easily and conveniently loaded, registered, transported for exposure, and returned at feasible manufacturing costs and with high reliability.

Inasmuch as the present invention is subject to many variations, modifications and changes in detail, it is intended that the foregoing description be interpreted as illustrative of a preferred mode and not in a limiting sense. For example, the sheet registration apparatus and method of the present invention has general utility for use with diverse apparatus such as punched card readers, production line sorting machines, reproduction apparatus, and the like. As such, it may be used in any application where a plurality of sheets of like size must be placed in accurate alignment.

What is claimed is:

1. An apparatus for registering a plurality of thin sheets of material of like size comprising:
   a frame;
   a four-sided carriage for supporting said sheet in superposition thereon, said carriage being mounted for movement on said frame;
   first and second stop means for engaging first and seond sides of said sheets disposed adjacent first and second opposite sides of said carriage, said first stop means comprising a fixed protrusion extending upwardly from said first side of said carriage and said second stop means comprising laterally movable means on the second side of said carriage which is movable toward said fixed protrusion;
   third and fourth stop means for engaging the third and fourth sides of said sheets and disposed adjacent the third and fourth opposite side of said carriage, said third and fourth stop means being movable relative to each other in response to movement of said carriage on said frame; and camming means on said frame to cause said laterally movable second stop means to move toward the first stop means in response to linear movement of the carriage on the frame, said camming means comprising a linear cam having a recess formed therein and a cam follower on said laterally movable second stop means for riding into, through and out of said recess in said linear cam as said carriage moves on said frame, whereby said laterally movable second stop means is first moved from a rest position toward said first stop means, thereby bringing said sheets into lateral registration and is thereafter retracted to said rest position.

2. The invention as recited in claim 1 further including a freely rotatable resilient roll on said frame for engagement with said sheets on said carriage, and wherein said third stop means comprises means journalled to rotate by frictional engagement with said roll as said carriage moves under said roll and drag members on said third stop means for contacting said sheets superposed on said carriage to flatten any curl existing therein and to urge said sheets against said fourth stop means thereby registering said sheets.

3. The invention as recited in claim 2 wherein said third stop means comprises a generally U-shaped frame, and wherein said drag members comprise a nose member protruding from said U-shaped frame centrally thereof and a pair of downwardly extending resilient drag members.

* * * * *